(12) United States Patent
Yoo et al.

(10) Patent No.: US 12,382,392 B2
(45) Date of Patent: Aug. 5, 2025

(54) BLUETOOTH DEVICE

(71) Applicant: LG INNOTEK CO., LTD., Seoul (KR)

(72) Inventors: Chang Hoon Yoo, Seoul (KR); Kyeng Suk Kim, Seoul (KR); Seung Taek Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 461 days.

(21) Appl. No.: 17/921,209

(22) PCT Filed: Apr. 27, 2021

(86) PCT No.: PCT/KR2021/005288
§ 371 (c)(1),
(2) Date: Oct. 25, 2022

(87) PCT Pub. No.: WO2021/225320
PCT Pub. Date: Nov. 11, 2021

(65) Prior Publication Data
US 2023/0171696 A1    Jun. 1, 2023

(30) Foreign Application Priority Data
May 4, 2020  (KR) ........................ 10-2020-0053308

(51) Int. Cl.
*H04W 52/02*  (2009.01)
*H04W 4/80*  (2018.01)
(Continued)

(52) U.S. Cl.
CPC ....... *H04W 52/0225* (2013.01); *H04W 76/30* (2018.02); *H04W 84/20* (2013.01); *H04W 4/80* (2018.02)

(58) Field of Classification Search
CPC ......... H04W 4/00–08; H04W 4/30–48; H04W 4/70; H04W 4/80; H04W 76/00–38; H04W 84/18–22
See application file for complete search history.

(56) References Cited

U.S. PATENT DOCUMENTS

| | | | |
|---|---|---|---|
| 9,544,853 B1 * | 1/2017 | Gu | ........................ H04B 1/3822 |
| 2006/0094477 A1 | 5/2006 | Rivera-Cintron et al. | |

(Continued)

FOREIGN PATENT DOCUMENTS

| | | |
|---|---|---|
| CN | 110412503 A | 11/2019 |
| KR | 10-2016-0012884 A | 2/2016 |

(Continued)

*Primary Examiner* — San Htun
(74) *Attorney, Agent, or Firm* — Birch, Stewart, Kolasch & Birch, LLP

(57) ABSTRACT

According to an embodiment, provided is a Bluetooth device comprising a master module and at least one slave module, wherein: the master module operates in an active mode when a mobile communication device is located within a pre-set range and switches to a power saving mode when the mobile communication device deviates from the pre-set range; in the active mode, the master module performs data communication by being connected to the mobile communication device located within the pre-set range and operates the Bluetooth device by periodically exchanging a packet with the slave module; and in the power saving mode, the master module operates in at least one of a first mode in which a packet exchange cycle with the slave module is adjusted from a first interval to a second interval, and a second mode in which a connection between the master module and the slave module is released.

20 Claims, 11 Drawing Sheets

(51) Int. Cl.
*H04W 76/30* (2018.01)
*H04W 84/20* (2009.01)

(56) References Cited

U.S. PATENT DOCUMENTS

| | | |
|---|---|---|
| 2012/0220351 A1* | 8/2012 | Kerai .................... H04W 84/20 |
| | | 455/574 |
| 2015/0065053 A1 | 3/2015 | Cho et al. |
| 2017/0006151 A1 | 1/2017 | Doorandish |
| 2017/0055108 A1 | 2/2017 | Jeon |
| 2017/0078954 A1 | 3/2017 | Zakaria |
| 2017/0230902 A1 | 8/2017 | Park et al. |
| 2018/0049257 A1* | 2/2018 | Liu ......................... H04W 4/80 |
| 2018/0103414 A1* | 4/2018 | Golsch ................... H04W 4/30 |
| 2019/0053021 A1* | 2/2019 | Fuke ....................... E05B 83/36 |
| 2019/0159271 A1 | 5/2019 | Wang et al. |

FOREIGN PATENT DOCUMENTS

| | | |
|---|---|---|
| KR | 10-1673308 B1 | 11/2016 |
| KR | 10-2017-0092795 A | 8/2017 |
| KR | 10-2018-0003024 A | 1/2018 |
| KR | 10-2018-0100833 A | 9/2018 |

\* cited by examiner

[FIG. 1]
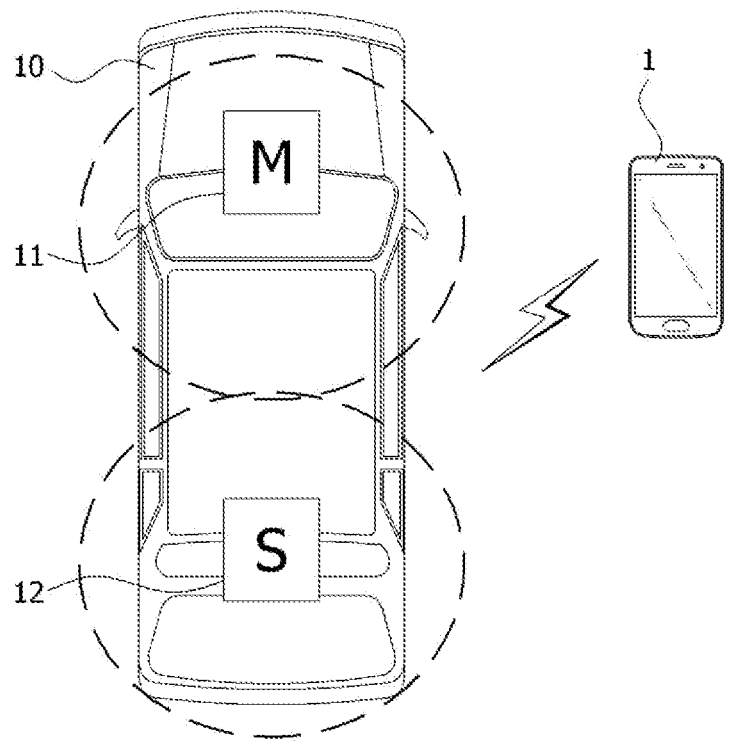
[FIG. 2]
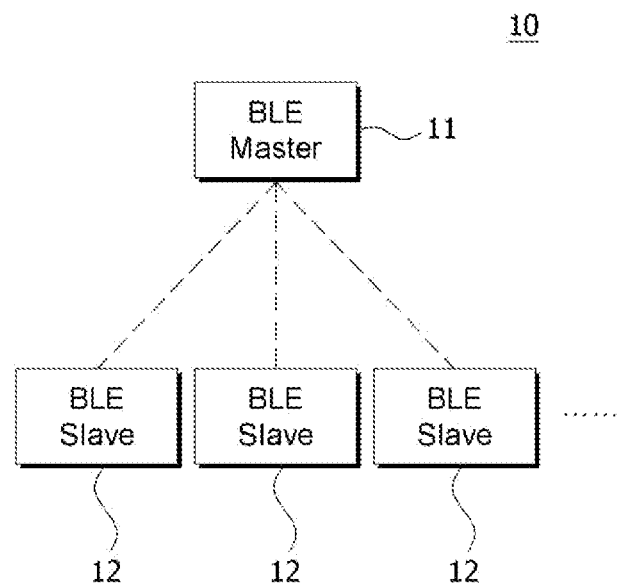

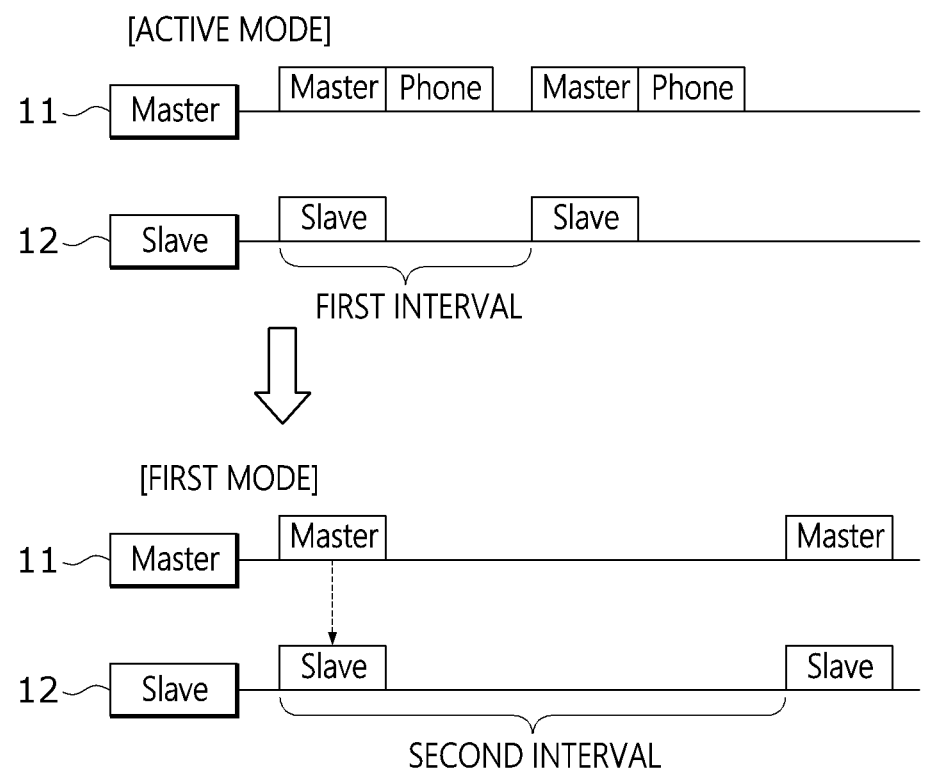

[FIG. 4]
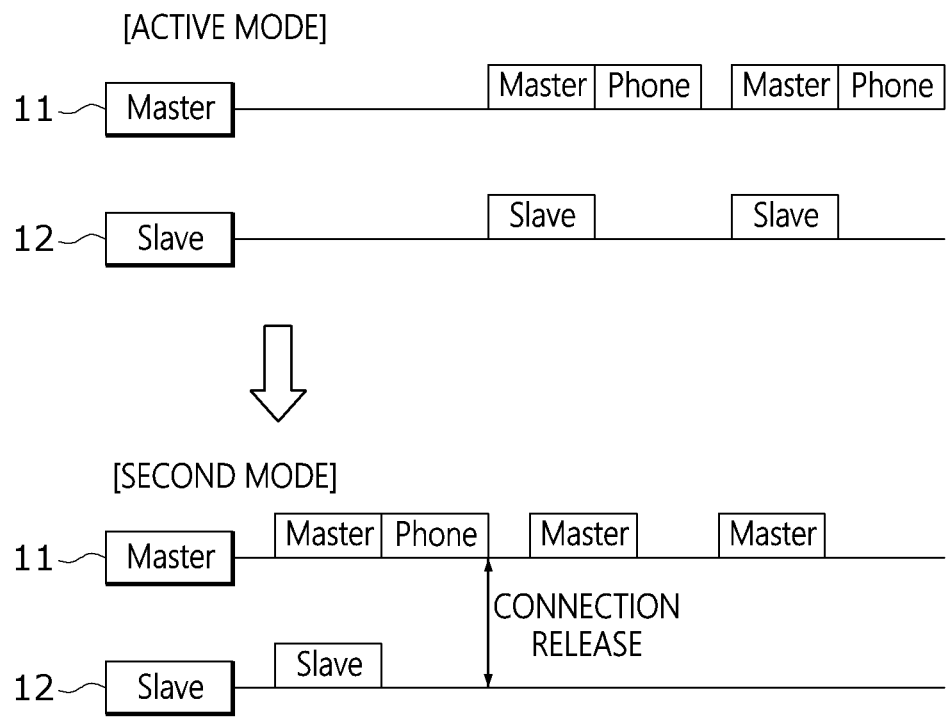

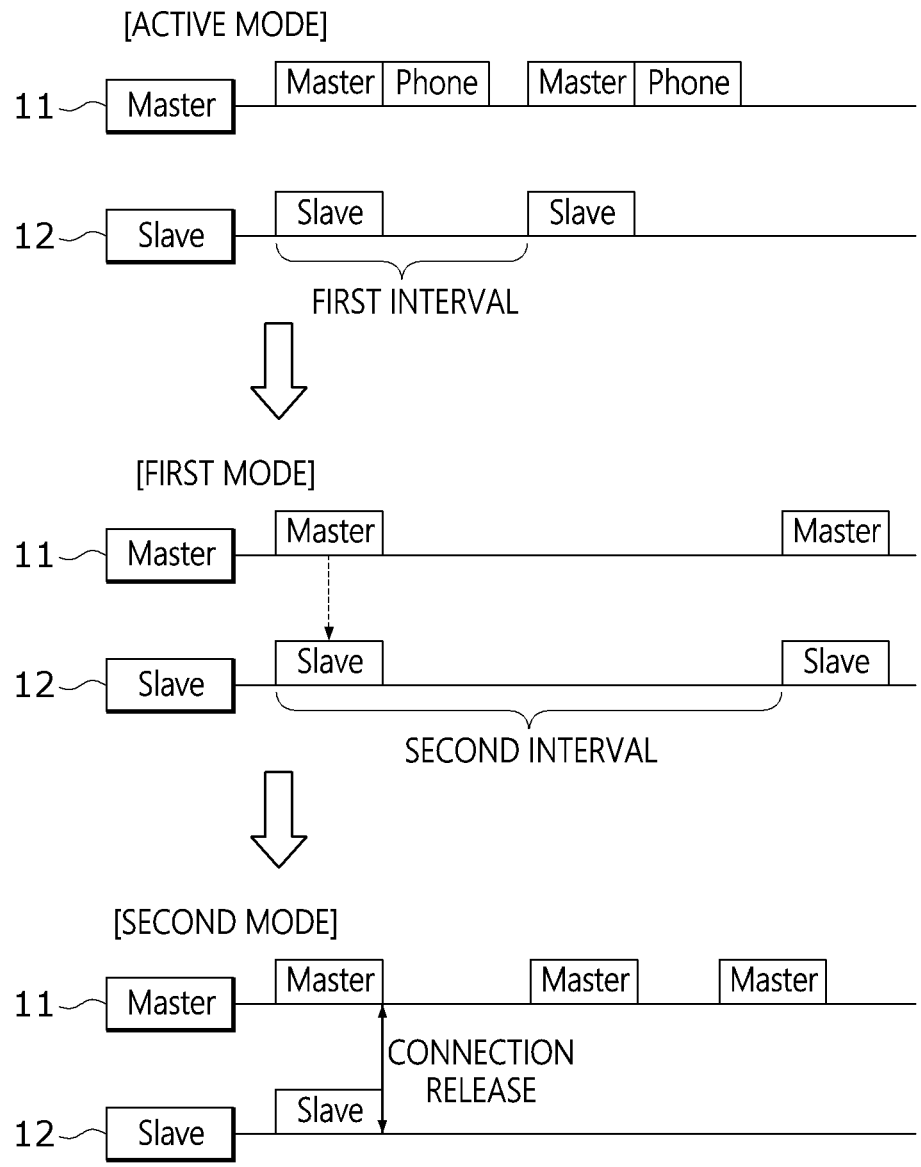
[FIG. 5]

[FIG. 6]
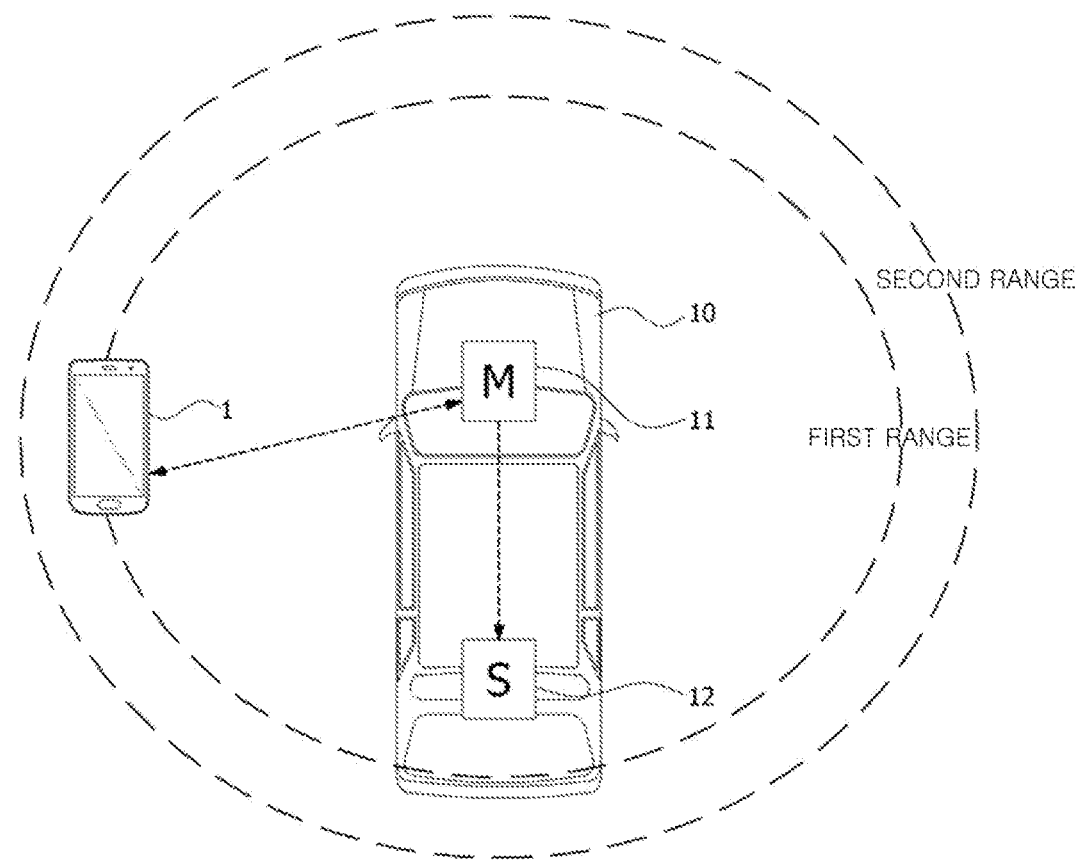

[FIG. 7]
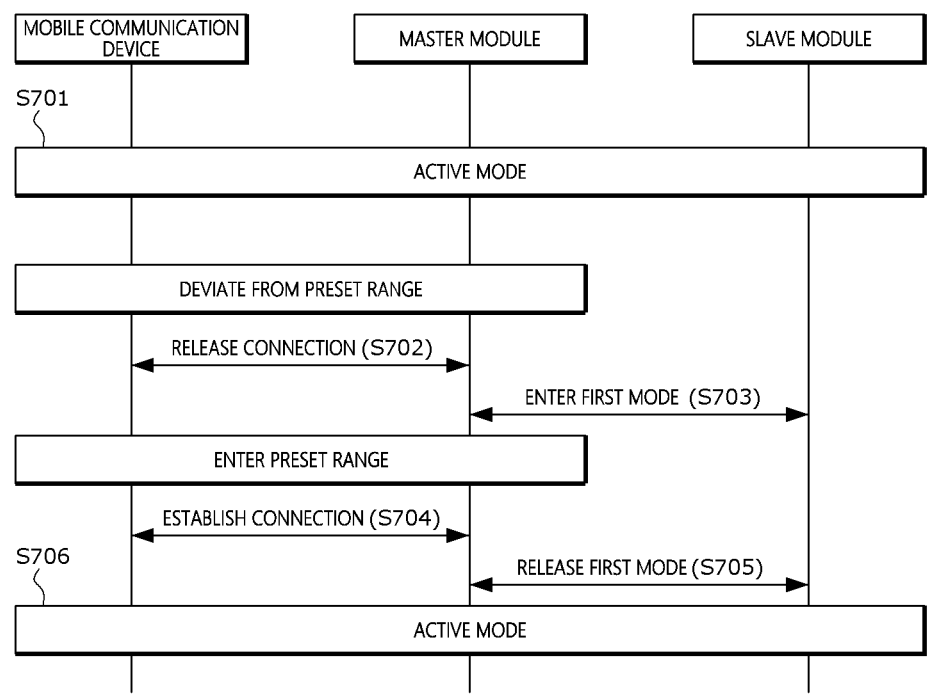

[FIG. 8]
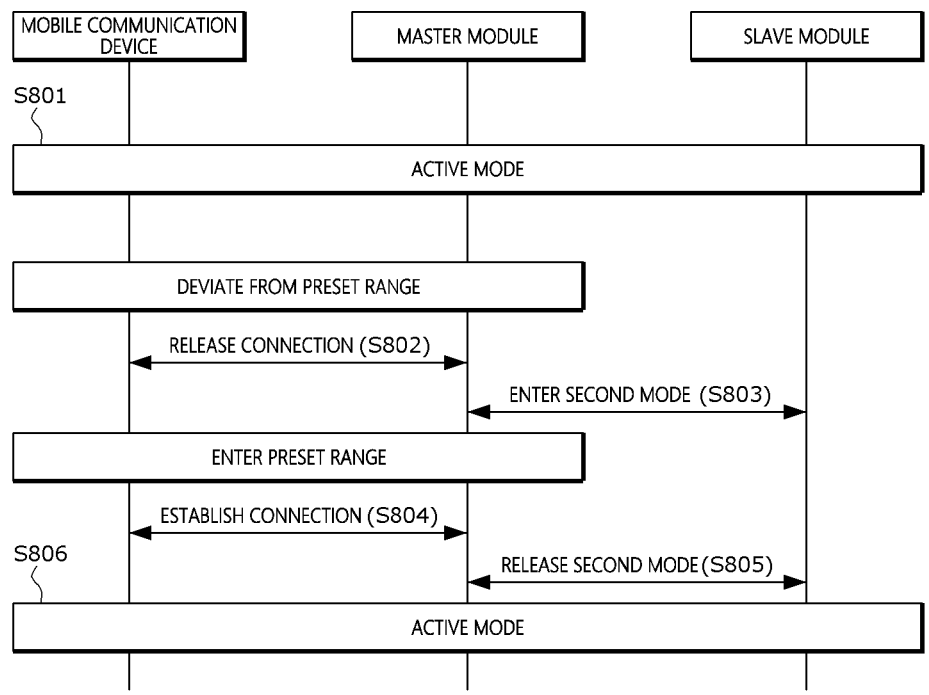

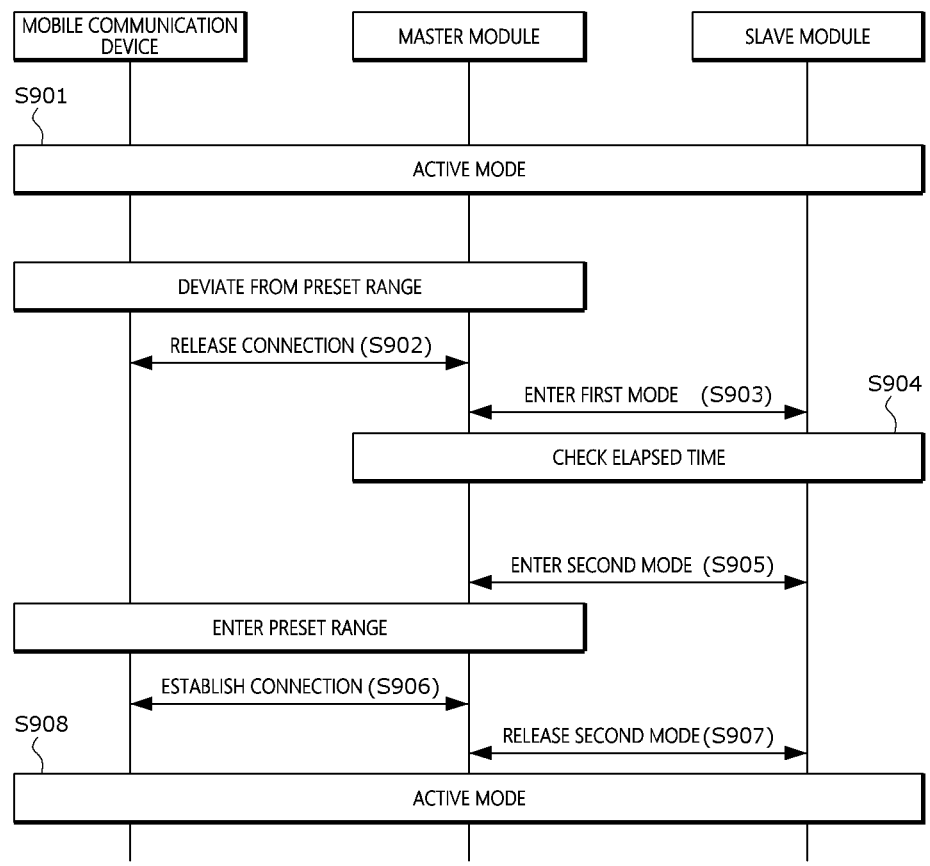

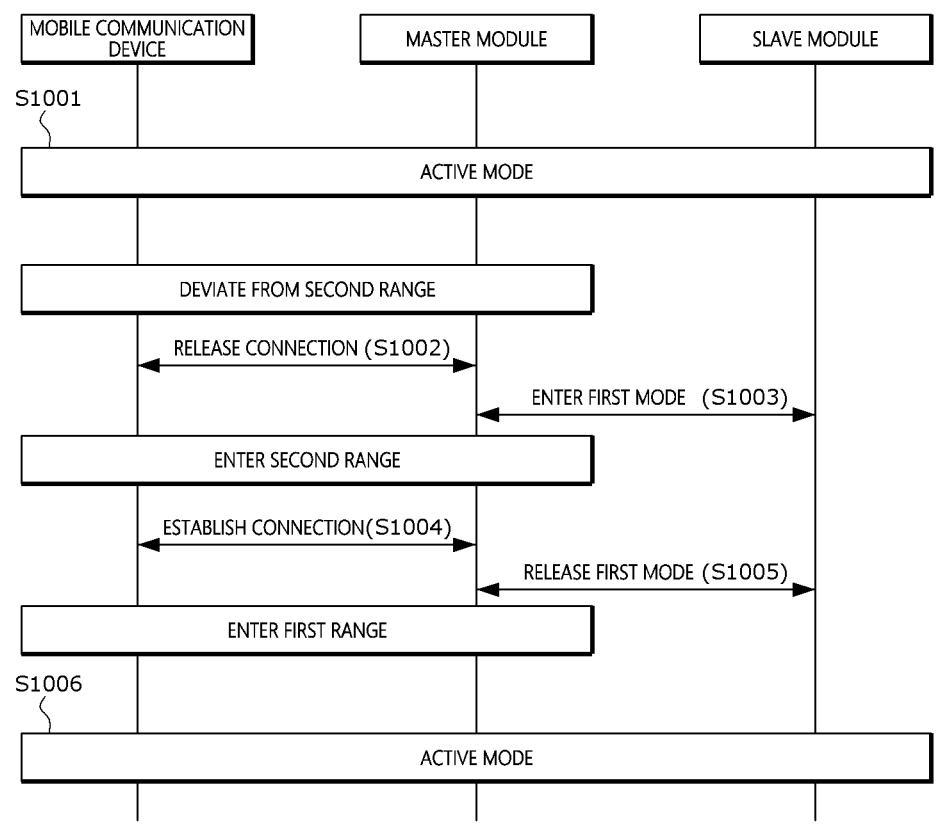
[FIG. 10]

[FIG. 11]
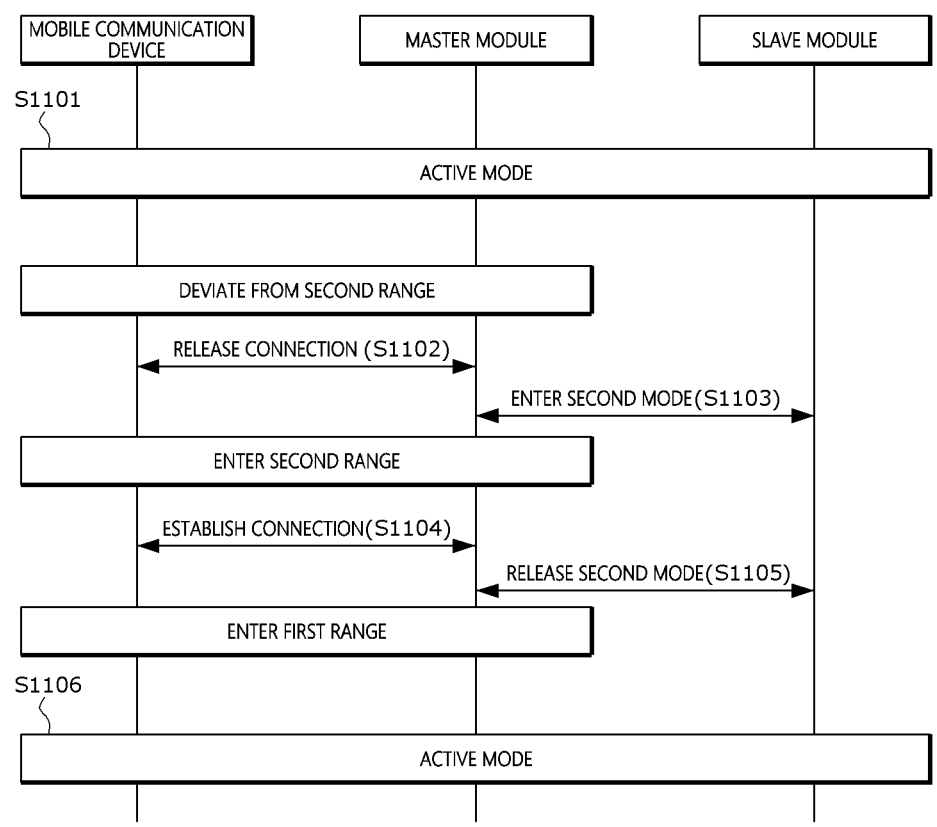

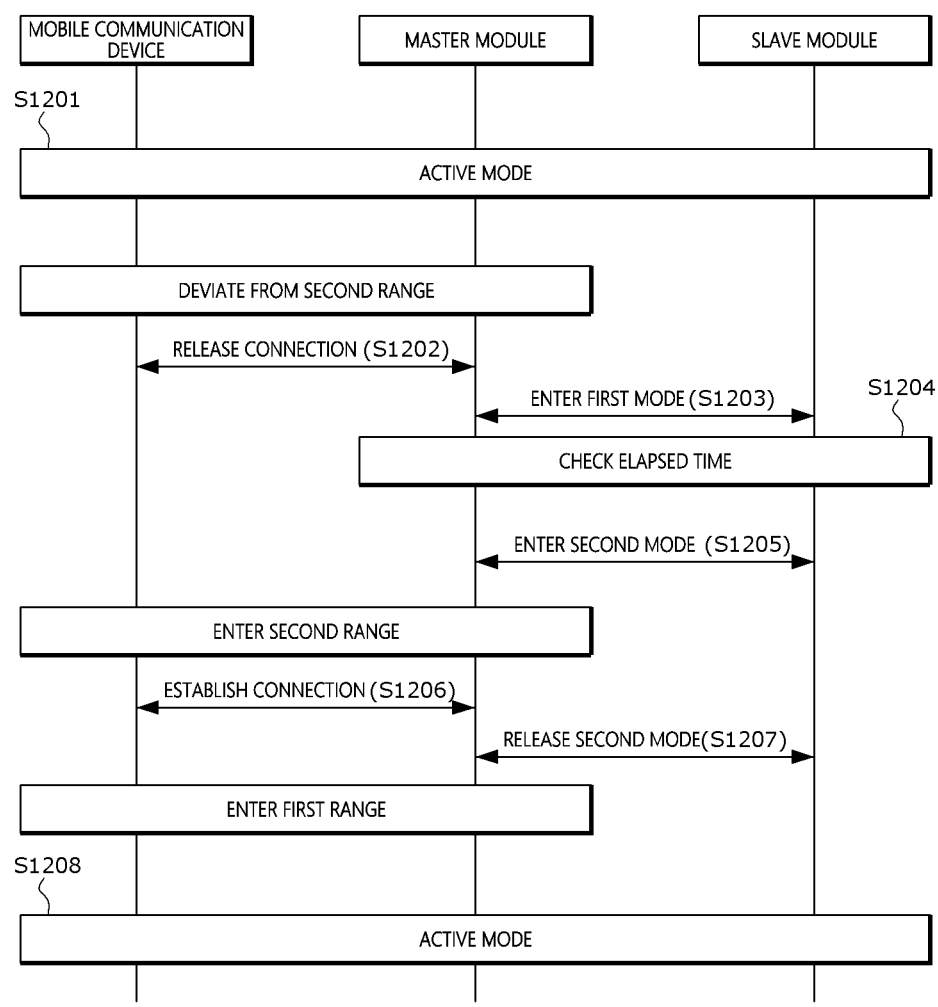
[FIG. 12]

BLUETOOTH DEVICE

CROSS REFERENCE TO RELATED APPLICATIONS

This application is the National Phase of PCT International Application No. PCT/KR2021/005288, filed on Apr. 27, 2021, which claims priority under 35 U.S.C. § 119(a) to Patent Application No. 10-2020-0053308, filed in the Republic of Korea on May 4, 2020, all of which are hereby expressly incorporated by reference into the present application.

TECHNICAL FIELD

An embodiment of the present invention relates to a Bluetooth device.

BACKGROUND ART

Bluetooth is a short-range wireless technology standard for wirelessly connecting various devices in a short range. For Bluetooth connection, a user searches for Bluetooth devices and requests a connection using the user's device, for example, a host device.

In order to connect between the host device and the Bluetooth device, the user needs to directly search and request a connection. To this end, there is a problem in that the user needs to search for the Bluetooth devices for connection between the host device and the Bluetooth device, that is, pairing and perform an operation for performing the pairing between the host device and the Bluetooth device.

In addition, there is a problem in that a large amount of data transmission and reception is required when a plurality of Bluetooth modules operate in conjunction with one another, and an additional current is continuously consumed when the wireless connection is maintained and operated.

Technical Problem

The present invention is directed to providing a Bluetooth device in which a plurality of Bluetooth modules can be operated in conjunction with one another.

In addition, the present invention is directed to providing a Bluetooth device in which a degree of freedom in design can be expanded.

The present invention is also directed to providing a Bluetooth device which can decrease current consumption required for operation by automatically controlling an operation mode according to a positional relationship with a mobile device.

Technical Solution

According to an embodiment, there is provided a Bluetooth device including a master module and at least one slave module, wherein the master module operates in an active mode when a mobile communication device is positioned within a preset range and switches to a power saving mode when the mobile communication device deviates from the preset range, in the active mode, the master module is connected to the mobile communication device positioned within the preset range to perform data communication and operates the Bluetooth device by periodically exchanging a packet with the slave module, and in the power saving mode, the master module operates in at least one of a first mode in which a packet exchange cycle with the slave modules is adjusted from a first interval to a second interval and a second mode in which a connection between the master module and the slave module are released.

The second interval may be set to be longer than the first interval.

A ratio of the second interval to the first interval may be set differently according to the type of data exchanged between the master module and the slave module.

As the type of data is more important, a length of the second interval may be set to be relatively shorter compared to a case in which the type of data is unimportant.

In the power saving mode, the master module may release the connection with the mobile communication device.

The master module may manage the slave module by switching to the power saving mode when the mobile communication device deviates from a preset second range and release the power saving mode when the mobile communication device enters the second range again.

The master module may switch to the active mode when the mobile communication device enters a preset first range.

The second range may be set to be greater than the first range.

In the active mode, the Bluetooth device may perform a task under the control of the mobile communication device.

The master module and the slave module may operate according to the first mode for a first period initially and operate according to the second mode for a second period after the first period based on a timing point when the mobile communication device deviates from the preset range.

Advantageous Effects

According to a Bluetooth device according to the present invention, a plurality of Bluetooth modules can be operated in conjunction with one another.

In addition, it is possible to expand the degree of freedom in design and decrease the cost required for manufacturing.

In addition, it is possible to minimize current consumption required for operation by automatically controlling an operation mode according to a positional relationship with a mobile device.

In addition, it is possible to minimize frequent discharge of a vehicle or a product due to current consumption and increase the lifespan of a battery.

DESCRIPTION OF DRAWINGS

FIG. 1 is a conceptual diagram for describing a Bluetooth device according to an embodiment.

FIG. 2 is a configuration diagram of the Bluetooth device according to the embodiment.

FIGS. 3 to 6 are views for describing an operation of the Bluetooth device according to the embodiment.

FIGS. 7 to 12 are operational flowcharts of the Bluetooth device according to the embodiment.

MODES OF THE INVENTION

Hereinafter, exemplary embodiments of the present invention will be described in detail with reference to the accompanying drawings.

However, the technical spirit of the present invention is not limited to some of the described embodiments but may be implemented in various different forms, and one or more of the components may be used by being selectively coupled and substituted without departing from the scope of the technical spirit of the present invention.

In addition, terms (including technical and scientific terms) used in the embodiments of the present invention may be construed as the meaning that may be generally understood by those skilled in the art to which the present invention pertains unless clearly and especially defined and described, and generally used terms such as terms defined in dictionaries may be construed in consideration of the contextual meaning of the related art.

In addition, the terms used in the embodiments of the present invention are to describe the embodiments and are not intended to limit the present invention.

In this specification, the singular form may also include the plural form unless otherwise specified in the phrase, and when it is described as "at least one (or one or more) of A and B, C", it may include one or more of all possible combinations of A, B, and C.

In addition, in describing the components of the embodiment of the present invention, terms such as first, second, A, B, (a), and (b) may be used.

These terms are only intended to distinguish the component from other components, and the essence, sequence, or order of the corresponding components is not limited by the terms.

In addition, when it is described that a component is "connected", "coupled", or "joined" to another component, this may include a case in which the component is not only directly connected, coupled, or joined to another component, but also a case in which the component is "connected", "coupled", or "joined" to another component through other components interposed therebetween.

In addition, when a component is described as being formed or disposed on "top (above) or bottom (below)" of another component, the top (above) or bottom (below) includes not only a case in which two components come into direct contact with each other but also a case in which one or more other components are formed or disposed between the two components. In addition, when expressed as "top (above) or bottom (below)", this may also include the meaning of not only an upward direction but also a downward direction with respect to one component.

Hereinafter, the embodiment will be described in detail with reference to the accompanying drawings, and the same or corresponding components are given the same reference numerals regardless of the reference numerals, and the overlapping description thereof will be omitted.

FIG. 1 is a conceptual diagram for describing a Bluetooth device according to an embodiment, and FIG. 2 is a configuration diagram of the Bluetooth device according to the embodiment.

Referring to FIGS. 1 and 2, in the embodiment, a Bluetooth device 10 may be a device equipped with a plurality of Bluetooth modules to perform a task, such as vehicles, home theaters, game machines, desktops, tablet computers, notebook computers, and smart phones.

In the following embodiment, a vehicle will be described as an example but the present invention is not limited thereto.

The Bluetooth device 10 according to the embodiment may include a master module 11 and at least one slave module 12.

The master module 11 may operate in an active mode when a mobile communication device 1 is positioned within a preset range and switch to a power saving mode when the mobile communication device 1 deviates from the preset range.

The master module 11 may operate the Bluetooth device 10 by periodically exchanging a packet with the slave module 12 in the active mode in which data communication is performed by being connected to the mobile communication device 1 positioned within the preset range. The mobile communication device 1 may be, for example, a smart phone. However, the present invention is not limited thereto, and may refer to various mobile devices which may perform Bluetooth communication with the Bluetooth device 10 in a short range.

In the embodiment, the mobile communication device and the Bluetooth device may perform data communication by a Bluetooth method at a distance within 100 m with an output of 100 mW at maximum using a frequency band of 2.4 to 2.485 GHz.

In the embodiment, the active mode may refer to a state in which the mobile communication device 1 and the Bluetooth device 10 are connected to perform the data communication by the Bluetooth method, so that the Bluetooth device 10 is performing a task under the control of the mobile communication device 1. Alternatively, the action mode may refer to a state in which the Bluetooth device 10 is performing a task previously requested by the mobile communication device 1. In the active mode, the mobile communication device 1 and the master module 11 are interconnected to perform the data communication by the Bluetooth communication method, and the master module 11 and the slave module 12 may periodically exchange a data packet.

In the active mode, the Bluetooth device 10 may perform various tasks such as music reproduction, video reproduction, voice call, video call, and navigation guidance.

In the embodiment, the preset range may refer to a maximum range in which the master module 11 may maintain a connection state by recognizing the mobile communication device 1. The preset range may be variously set according to the type, purpose, and operation environment of the Bluetooth device 10.

In the embodiment, the Bluetooth device 10 and the mobile communication device 1 may measure each other's distance according to a receive signal strength indicator (RSSI) of the data packet exchanged through the Bluetooth communication.

The master module 11 may manage the slave module 12 by switching to the power saving mode when the mobile communication device 1 deviates from the preset range. The power saving mode may include at least one of a first mode in which a packet exchange cycle between the master module 11 and the slave module 12 is adjusted from a first interval to a second interval and a second mode in which the connection between the master module 11 and the slave module 12 is released.

When the mobile communication device 1 deviates from the preset range, the master module 11 may release the active mode and enter the power saving mode. In the power saving mode, the connection between the master module 11 and the mobile communication device 1 may be released, and the Bluetooth device 10 may stop performing the task. In addition, in the power saving mode, the master module 11 and the slave module 12 may operate according to at least one of the first mode and the second mode.

FIG. 3 is a view for describing an operation of the Bluetooth device 10 according to the embodiment. Referring to FIG. 3, in the first mode, the master module 11 may change the data packet exchange cycle while maintaining the connection state of the slave module 12. In the first mode, the master module 11 may adjust the data exchange cycle from the first interval to the second interval. The second interval may be set to be longer than the first interval.

In the active mode, the Bluetooth device 10 is in an operation state, and the master module 11 may periodically exchange the data packet with the slave module 12 according to the first interval for operating the Bluetooth device 10. However, in the first mode, the Bluetooth device 10 stops operating, and the master module 11 may exchange only a minimum data packet for maintaining the connection with the slave module 12. Accordingly, in the first mode, the master module 11 can decrease the amount of current consumed to maintain the connection by adjusting the data packet exchange cycle with the slave module 12 from the first interval to the second interval.

In this case, a ratio of the second interval to the first interval may be set differently according to the type of data exchanged between the master module 11 and the slave module 12. In other words, the type of data may be determined according to the type of task performed by the Bluetooth device 10 in the active mode, and the ratio of the second interval to the first interval may be set differently according to the type of data.

For example, a length of the first interval is defined as 100 ms. In this case, when the task performed by the Bluetooth device 10 is a task which is relatively more important than music reproduction or video reproduction, such as navigation guidance, a length of the second interval may be set to 500 ms. In comparison, when the task performed by the Bluetooth device 10 is a relatively unimportant task such as music reproduction or video reproduction, the length of the second interval may be set to 1000 ms. In the embodiment, the ratio of the first interval to the second interval may be variously set according to the type, purpose, operation environment, and the like of the device.

As described above, the second interval when the type of data is relatively important may be set to be shorter than the second interval when the type of data is relatively unimportant. The second interval may be set to be shorter as the importance of the type of data is higher, and the second interval may be set to be longer as the importance of the data type is lower. In other words, the importance of the type of data may be set to a relationship that is inversely proportional to the length of the second interval.

FIG. 4 is a view for describing the operation of the Bluetooth device 10 according to the embodiment. Referring to FIG. 4, in the second mode, the master module 11 may release the connection with the slave module 12. In the second mode, it is possible to minimize the amount of current consumed to maintain the connection by releasing the connection between the mobile communication device 1 and the master module 11 and also releasing the connection between the master module 11 and the slave module 12.

In addition, in the power saving mode, the master module 11 and the slave module 12 may operate according to the first mode and the second mode.

FIG. 5 is a view for describing the operation of the Bluetooth device 10 according to the embodiment. Referring to FIG. 5, the master module 11 and the slave module 12 may operate according to the first mode for a first period initially and operate according to the second mode for a second period after the first period based on a time point when the mobile communication device 1 deviates from the preset range.

In other words, the master module 11 and the slave module 12 may exchange the data packet according to the second interval in a state in which the master module 11 maintains the connection state of the slave module 12 for the first period after the mobile communication device 1 deviates from the preset range. Thereafter, when the mobile communication device 1 does not enter the preset range even after the first period has elapsed, the master module 11 may release the connection with the slave module 12.

Accordingly, the master module 11 and the slave module 12 may operate in the first mode for an initial certain period in which the master module 11 enters the power saving mode to maintain the connection state between the master module 11 and the slave module 12. Thereafter, when the power saving mode state is not released and continues, the master module 11 enters the second mode to release the connection between the master module 11 and the slave module 12, so that it is possible to minimize the current consumption.

The master module 11 may release the power saving mode and enter the active mode when the mobile communication device 1 enters the preset range again. When the mobile communication device 1 enters the preset range, the master module 11 may be connected to the mobile communication device 1 to perform the data communication and may release the power saving mode.

At this time, when the master module 11 and the slave module 12 are operating in the first mode, the master module 11 may adjust the data exchange cycle with the slave module 12 from the second interval to the first interval. Alternatively, when the master module 11 and the slave module 12 are operating in the second mode, the master module 11 may be connected to the slave module 12 to exchange the data packet using the first interval as the period. At this time, the master module 11 may establish the connection with the slave module by transmitting a wake-up signal to the slave module 12.

In addition, when the mobile communication device 1 enters the preset range again, the Bluetooth device 10 may enter the active mode to perform a task.

FIG. 6 is a view for describing the operation of the Bluetooth device 10 according to the embodiment. Referring to FIG. 6, in the embodiment, the master module 11 may manage the slave module 12 by switching to the power saving mode when the mobile communication device 1 deviates from a preset second range and release the power saving mode when the mobile communication device 1 enters the second range again. In addition, the master module 11 may switch to the active mode when the mobile communication device 1 enters a preset first range. In the embodiment, the second range may be set to be greater than the first range.

According to the embodiment, the master module 11 may release the active mode when the mobile communication device 1 deviates from the preset second range and enter the power saving mode. In the power saving mode, the connection between the master module 11 and the mobile communication device 1 may be released, and the Bluetooth device 10 may stop performing the task. In addition, in the power saving mode, the master module 11 and the slave module 12 may operate according to at least one of the first mode and the second mode.

The master module 11 may release the power saving mode when the mobile communication device 1 enters the second range again. When the mobile communication device 1 enters the preset range, the master module 11 may be connected to the mobile communication device 1 to perform the data communication and may release the power saving mode.

At this time, when the master module 11 and the slave module 12 are operating in the first mode, the master module 11 may adjust the data exchange cycle with the slave module 12 from the second interval to the first interval. Alternatively, when the master module 11 and the slave module 12 are operating in the second mode, the master module 11 may be connected to the slave module 12 to exchange the data packet using the first interval as the period.

The Bluetooth device 10 may enter the active mode to perform the task when the mobile communication device 1 enters the preset first range again. In other words, the Bluetooth device 10 is in a standby state which does not operate until the mobile communication device 1 enters the first range again and may enter the active mode when the mobile communication device 1 enters the first range again to perform the task. In other words, the standby state may refer to a state in which the connection between the mobile communication device 1 and the master module 11 is established, and the master module 11 and the slave module exchange the data packet according to the first interval but the Bluetooth device 10 does not operate.

FIG. 7 is an operational flowchart of the Bluetooth device according to the embodiment.

Referring to FIG. 7, first, the mobile communication device is positioned within the preset range of the Bluetooth device. The Bluetooth device may perform the task under the control of the mobile communication device or the task requested by the mobile communication device in the active mode (S701).

Next, when the mobile communication device deviates from the preset range, the connection between the master module and the mobile communication device may be released, and the Bluetooth device may stop the task being performed (S702).

Next, the master module and the slave module may enter the first mode. In the first mode, the master module may adjust the data exchange cycle from the first interval to the second interval (S703).

Next, when the mobile communication device enters the preset range, the master module may establish the connection with the mobile communication device (S704).

Next, the master module may release the first mode and adjust the data exchange cycle with the slave module from the second interval to the first interval (S705).

Next, the Bluetooth device may enter the active mode to perform the task. The Bluetooth device may automatically perform the task performed in the active mode before entering the first mode (S706).

FIG. 8 is an operational flowchart of the Bluetooth device according to the embodiment.

Referring to FIG. 8, first, the mobile communication device is positioned within the preset range of the Bluetooth device. The Bluetooth device may perform the task under the control of the mobile communication device or the task requested by the mobile communication device in the active mode (S801).

Next, when the mobile communication device deviates from the preset range, the connection between the master module and the mobile communication device may be released, and the Bluetooth device may stop the task being performed (S802).

Next, the master module and the slave module may enter the second mode. In the second mode, the master module may release the connection with the slave module (S803).

Next, when the mobile communication device enters the preset range, the master module may establish the connection with the mobile communication device (S804).

Next, the master module may release the second mode and establish the connection with the slave module (S805).

Next, the Bluetooth device may enter the active mode to perform the task. The Bluetooth device may automatically perform the task performed in the active mode before entering the second mode (S806).

FIG. 9 is an operational flowchart of the Bluetooth device according to the embodiment.

Referring to FIG. 9, first, the mobile communication device is positioned within the preset range of the Bluetooth device. The Bluetooth device may perform the task under the control of the mobile communication device or the task requested by the mobile communication device in the active mode (S901).

Next, when the mobile communication device deviates from the preset range, the connection between the master module and the mobile communication device may be released, and the Bluetooth device may stop the task being performed (S902).

Next, the master module and the slave module may enter the first mode. In the first mode, the master module may adjust the data exchange cycle from the first interval to the second interval (S903).

Next, the master module checks the elapsed time based on the time point when the mobile communication device deviates from the preset range. The master module may maintain the first mode when the mobile communication device is in a state of having not elapsed the first period since deviating from the preset range (S904).

The master module may operate in the second mode to release the connection with the slave module when the communication device is in a state of having elapsed the first period since deviating from the preset range (S905).

Next, when the mobile communication device enters the preset range, the master module may establish the connection with the mobile communication device (S906).

Next, the master module may release the second mode and establish the connection with the slave module (S907).

Next, the Bluetooth device may enter the active mode to perform the task. The Bluetooth device may automatically perform the task performed in the active mode before entering the first mode (S908).

FIG. 10 is an operational flowchart of the Bluetooth device according to the embodiment.

Referring to FIG. 10, first, the mobile communication device is positioned within the preset second range of the Bluetooth device. The Bluetooth device may perform the task under the control of the mobile communication device or the task requested by the mobile device in the active mode (S1001).

Next, when the mobile communication device deviates from the preset second range, the connection between the master module and the mobile communication device may be released, and the Bluetooth device may stop the task being performed (S1002).

Next, the master module and the slave module may enter the first mode. In the first mode, the master module may adjust the data exchange cycle from the first interval to the second interval (S1003).

Next, when the mobile communication device enters the preset second range, the master module may establish the connection with the mobile communication device (S1004).

Next, the master module may release the first mode and adjust the data exchange cycle with the slave module from the second interval to the first interval (S1005).

Next, when the mobile communication device enters the preset first range, the Bluetooth device may enter the active mode to perform the task. The Bluetooth device may automatically perform the task performed in the active mode before entering the first mode (S1006).

FIG. 11 is an operational flowchart of the Bluetooth device according to the embodiment.

Referring to FIG. 11, first, the mobile communication device is positioned within the preset second range of the Bluetooth device. The Bluetooth device may perform the task under the control of the mobile communication device or the task requested by the mobile device in the active mode (S1101).

Next, when the mobile communication device deviates from the preset second range, the connection between the master module and the mobile communication device may be released, and the Bluetooth device may stop the task being performed (S1102).

Next, the master module and the slave module may enter the second mode. In the second mode, the master module may release the connection with the slave module (S1103).

Next, when the mobile communication device enters the preset second range, the master module may establish the connection with the mobile communication device (S1104).

Next, the master module may release the second mode and establish the connection with the slave module (S1105).

Next, when the mobile communication device enters the preset first range, the Bluetooth device may enter the active mode to perform the task. The Bluetooth device may automatically perform the task performed in the active mode before entering the second mode (S1106).

FIG. 12 is an operational flowchart of the Bluetooth device according to the embodiment.

Referring to FIG. 12, first, the mobile communication device is positioned within the preset second range of the Bluetooth device. The Bluetooth device may perform the task under the control of the mobile communication device or the task requested by the mobile device in the active mode (S1201).

Next, when the mobile communication device deviates from the preset second range, the connection between the master module and the mobile communication device may be released, and the Bluetooth device may stop the task being performed (S1202).

Next, the master module and the slave module may enter the first mode. In the first mode, the master module may adjust the data exchange cycle from the first interval to the second interval (S1203).

Next, the master module checks the elapsed time based on the time point when the mobile communication device deviates from the preset range. The master module may maintain the first mode when the mobile communication device is in a state of having not elapsed the first period since deviating from the preset range (S1204).

When the communication device is in a state of having elapsed the first period since deviating from the preset second range, the master module may operate in the second mode to release the connection with the slave module (S1205).

Next, when the mobile communication device enters the preset second range, the master module may establish the connection with the mobile communication device (S1206).

Next, the master module may release the second mode and establish the connection with the slave module (S1207).

Next, when the mobile communication device enters the preset first range, the Bluetooth device may enter the active mode to perform the task. The Bluetooth device may automatically perform the task performed in the active mode before entering the first mode (S1208).

The term "~unit" used in the embodiment refers to software or hardware components such as a field-programmable gate array (FPGA) or an application specific integrated circuit (ASIC), and "~unit" performs certain roles. However, the "~unit" is not limited to software or hardware. The "~unit" may also be configured to be positioned on an addressable storage medium or may also be configured to reproduce one or more processors. Accordingly, as an example, "~unit" includes components such as software components, object-oriented software components, class components, and task components, processes, functions, attributes, procedures, subroutines, segments of program codes, drivers, firmware, microcodes, circuits, data, databases, data structures, tables, arrays, and variables. The functions provided in the components and the "~units" may be combined to a smaller number of components and "~units" or further separated into additional components and "~units". In addition, the components and the "~units" may be implemented to reproduce one or more CPUs in a device or a security multimedia card.

Although the above has been described with reference to exemplary embodiments of the present invention, those skilled in the art will be able to understand that the present invention may be variously modified and changed without departing from the spirit and scope of the present invention as set forth in the appended claims.

The invention claimed is:

1. A Bluetooth device comprising a master module and at least one slave module,
wherein the master module operates in an active mode when a mobile communication device is positioned within a preset range and switches to a power saving mode when the mobile communication device deviates from the preset range,
in the active mode, the master module is connected to the mobile communication device positioned within the preset range to perform data communication and operates the Bluetooth device by periodically exchanging a packet with the slave module, and
in the power saving mode, the master module operates in at least one of a first mode in which a packet exchange cycle with the slave modules is adjusted from a first interval to a second interval and a second mode in which a connection between the master module and the slave module are released.

2. The Bluetooth device of claim 1, wherein the second interval is set to be longer than the first interval.

3. The Bluetooth device of claim 2, wherein a ratio of the second interval to the first interval is set differently according to the type of data exchanged between the master module and the slave module.

4. The Bluetooth device of claim 3, wherein as the type of data is more important, a length of the second interval is set to be relatively shorter compared to a case in which the type of data is unimportant.

5. The Bluetooth device of claim 1, wherein in the power saving mode, the master module releases the connection with the mobile communication device.

6. The Bluetooth device of claim 1, wherein the master module manages the slave module by switching to the power saving mode when the mobile communication device deviates from a preset second range and releases the power saving mode when the mobile communication device enters the second range again.

7. The Bluetooth device of claim 6, wherein the master module switches to the active mode when the mobile communication device enters a preset first range.

8. The Bluetooth device of claim 7, wherein the second range is set to be greater than the first range.

9. The Bluetooth device of claim 1, wherein in the active mode, the Bluetooth device performs a task under the control of the mobile communication device.

10. The Bluetooth device of claim 1, wherein the master module and the slave module operate according to the first mode for a first period initially and operate according to the second mode for a second period after the first period based on a timing point when the mobile communication device deviates from the preset range.

11. A method of operating a Bluetooth device including a master module and at least one slave module, the method comprising:
 operating of the master module in an active mode when a mobile communication device is positioned within a preset range, and
 switching of the master module to a power saving mode when the mobile communication device deviates from the preset range,
 wherein the master module is connected to the mobile communication device positioned within the preset range to perform data communication and operates the Bluetooth device by periodically exchanging a packet with the slave module in the active mode, and
 wherein the master module operates in at least one of a first mode in which a packet exchange cycle with the slave modules is adjusted from a first interval to a second interval and a second mode in which a connection between the master module and the slave module are released in the power saving mode.

12. The method of claim 11, wherein the second interval is set to be longer than the first interval.

13. The method of claim 12, wherein a ratio of the second interval to the first interval is set differently according to the type of data exchanged between the master module and the slave module.

14. The method of claim 13, wherein as the type of data is more important, a length of the second interval is set to be relatively shorter compared to a case in which the type of data is unimportant.

15. The method of claim 11, wherein in the power saving mode, the master module releases the connection with the mobile communication device.

16. The method of claim 11, wherein the master module manages the slave module by switching to the power saving mode when the mobile communication device deviates from a preset second range and releases the power saving mode when the mobile communication device enters the second range again.

17. The method of claim 16, wherein the master module switches to the active mode when the mobile communication device enters a preset first range.

18. The method of claim 17, wherein the second range is set to be greater than the first range.

19. The method of claim 11, wherein in the active mode, the Bluetooth device performs a task under the control of the mobile communication device.

20. The method of claim 11, wherein the master module and the slave module operate according to the first mode for a first period initially and operate according to the second mode for a second period after the first period based on a timing point when the mobile communication device deviates from the preset range.

\* \* \* \* \*